(12) United States Patent
Tachibana et al.

(10) Patent No.: US 6,469,966 B1
(45) Date of Patent: Oct. 22, 2002

(54) DISC APPARATUS WITH A DISC DISCRIMINATING FUNCTION

(75) Inventors: Tadashi Tachibana; Yasunori Kuwayama, both of Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/360,329

(22) Filed: Jul. 23, 1999

(30) Foreign Application Priority Data

Aug. 10, 1998 (JP) .......................................... 10-225760

(51) Int. Cl.[7] ................................................ G11B 7/00
(52) U.S. Cl. .................................. 369/53.23; 369/44.27
(58) Field of Search .......................... 369/44.27, 44.29, 369/44.25, 53.2, 53.23, 94, 53.22, 44.37, 44.38

(56) References Cited

U.S. PATENT DOCUMENTS 6,137,758 A * 10/2000 Nemoto .................... 369/44.29

FOREIGN PATENT DOCUMENTS

JP         7-240027         9/1995

* cited by examiner

*Primary Examiner*—Thang V. Tran
(74) *Attorney, Agent, or Firm*—Lackenbach Siegel Marzullo Aronson & Greenspan

(57) ABSTRACT

In a disc apparatus, a tracking error signal from an optical pickup is outputted to a micro-computer. The micro-computer discriminates a disc that is different in bit density (track pitch) based on amplitude and/or waveform of the tracking error signal.

2 Claims, 4 Drawing Sheets

DISC APPARATUS WITH A DISC DISCRIMINATING FUNCTION

BACKGROUND OF THE INVENTION

1. Field of the Invention

This invention relates to disc apparatuses and, more particularly, to a disc apparatus having a function to discriminate a disc, such as DVD or CD, by irradiating laser light to the disc via an optical pickup.

2. Description of the Prior Art

There is one example of a prior art of this kind as disclosed in a publication of Japanese Patent Laid-open No. 240027/1995 [G11B 7/007, 7/00, 19/12] that was laid open to public on Sep. 12, 1995. This prior art is arranged to discriminate a disc based upon an RF signal level or pattern.

However, there has been a problem that the RF signal, in order to be turned into a read-out signal, cannot be passed through a noise-removing filter and hence is vulnerable to being affected by noise. Meanwhile, if in order to remove such noise an additional circuit must be provided on an RF signal path, there will be deterioration in the RF signal possibly resulting in data error. Thus, in the prior art, erroneous discrimination might occur due to noise.

SUMMARY OF THE INVENTION

Therefore, it is a primary object of the present invention to provide a novel disc apparatus with a function to discriminate a disc.

It is another object of the present invention to provide a disc apparatus provided with a novel disc discrimination function that is less affected by noise.

A disc apparatus according to the present invention, comprises: an optical pickup using one main beam and two sub-beams, the optical pickup including a main beam light receiving area to receive the main beam and two sub-beam light receiving areas to respectively receive the two sub-beam; a tracking servo means for receiving an output signal of the two sub-beam light receiving areas and effecting tracking control; a disabling means for disabling the tracking servo means; and an discriminating means for discriminating a disc being loaded using the output signal from the two sub-beam light receiving areas when the tracking servo means is disabled.

A tracking error signal is detected by sub-beams of a three beam method to discriminate a disc according to a level of difference obtained at that time. Specifically, using first and second discs different in track pitch, the sub-beam detecting light receiving elements are positioned for a track pitch of the first disc to detect a tracking error signal. In this case, a similar tracking error signal to the first disc cannot be obtained from the second disc. This is utilized to discriminate the disc.

According to the present invention, there is no possibility of erroneous discrimination due to noise because a tracking signal is used in the discrimination of a disc, such as CD or DVD. That is, the tracking error signal is narrow in band range as compared to the main beam (RF signal). Further, generally a servo filter is inserted in a signal path therefor. It is therefore possible to discriminate a disc in a manner resistive to noise, free from data error and-hence correctly.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
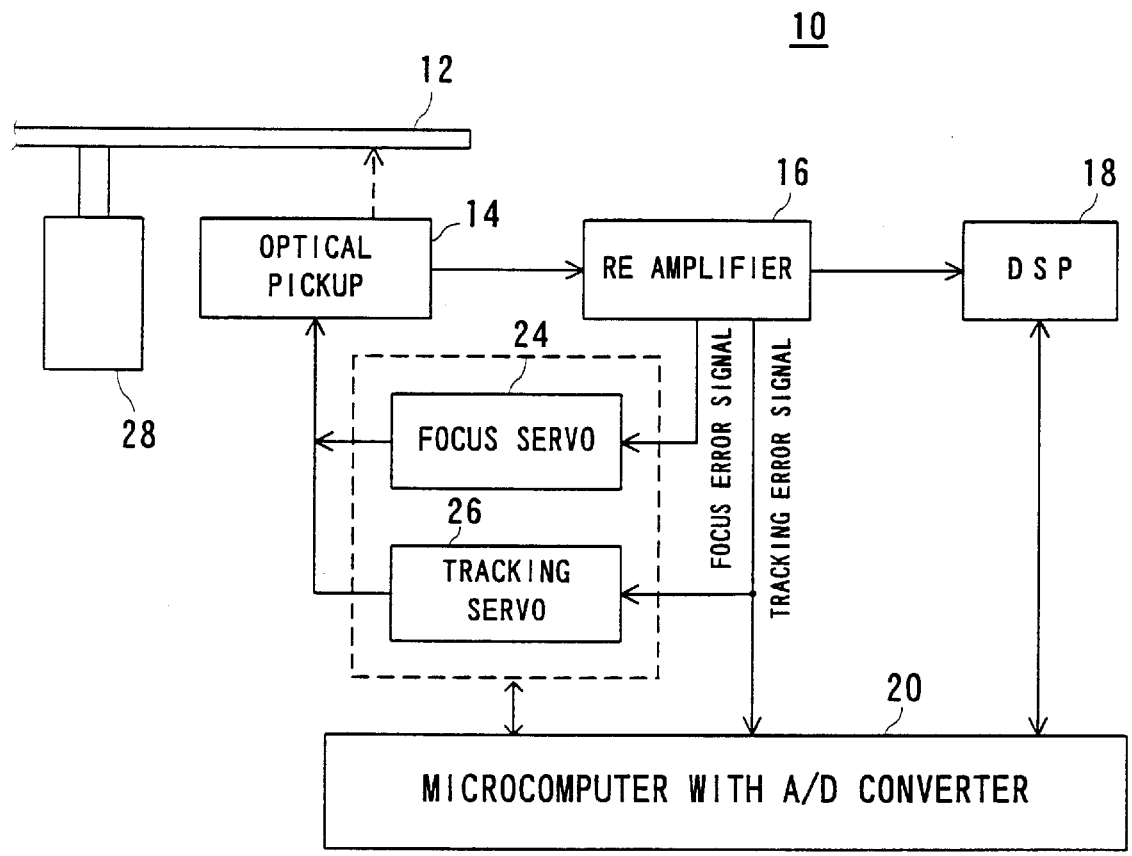
FIG. 1 is a block diagram showing one embodiment of the present invention

A disc apparatus 10 of an embodiment shown in FIG. 1 includes an optical pickup 14 for reproduction with a disc 12. The optical pickup 14 has a signal to be delivered through an RF amplifier 16 to a DSP (Digital Signal Processing Circuit) 18 and also to an input terminal of an A/D converter of a micro-computer 20.

Although not shown, the optical pickup 14 splits, as is well known, laser light into a main beam and sub-beams through a diffraction grating, and irradiates the split beams onto a disc 12 (FIG. 1) through a half mirror and objective lens. The main beam and sub-beams reflected from a disc record surface are introduced into a light receiving element 22 shown in FIG. 2 by way of the objective lens and half mirror.

Figure 2:
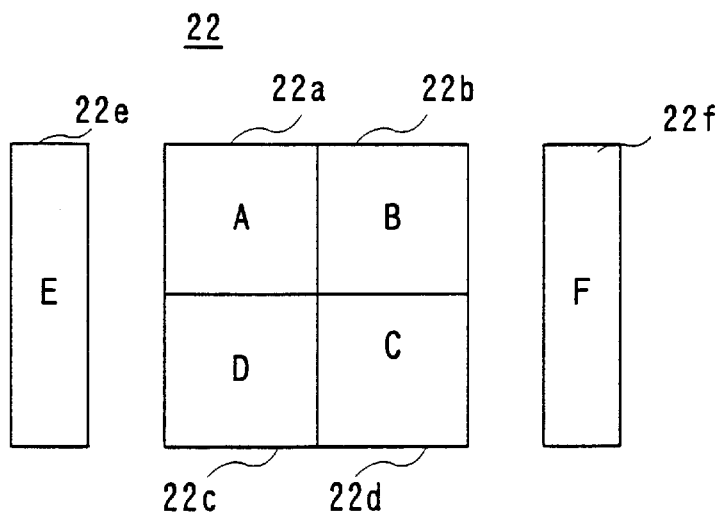
FIG. 2 is an illustrative view showing a light receiving section of an optical pickup of FIG. 1 embodiment.

The optical pickup 14 has a light receiving element 22 including, as shown in FIG. 2, four light receiving areas 22a, 22b, 22c and 22d to receive a main beam, and two light receiving areas 22e and 22f to individually receive two sub-beams. The sub-beam light receiving areas 22e and 22f are arranged in a manner clamping the main beam light receiving areas 22a–22d. This sub-beam light receiving areas 22e and 22f are to detect a tracking error signal (E–F) so that they are arranged in positions matched to a track pitch of a disc to be used (in this example, 180 degrees). The main beam light receiving elements 22a–22b have signals which are turned into an RF signal (A+B+C+D) as stated above and further utilized for a focus error signal (A+C)–(B+D). When a main beam (0 order light) is on a disc track center, the sub-beam (1 order light) receiving areas 22e and 22f are same in light detection amount (E–F=0). If the main beam deviates off the track center, a difference occurs in light detection amount between the areas 22e and 22f hence producing a tracking error signal (E–F).

The focus error signal (A+C)–(B+D) from the RF amplifier 16 is supplied to a focus servo circuit 24, while a tracking error signal (E–F) therefrom is to a tracking servo circuit 26. Consequently, focus servo and tracking servo are respectively effected by the servo circuits 24 and 26 in a conventionally well-known way.

In this embodiment, the tracking error signal (E–F) is further supplied to an A/D port of the micro-computer 20. Accordingly, the tracking error signal is fetched by to the micro-computer 20. The micro-computer 20 discriminates a disc, such as CD or DVD, through utilizing a tracking error signal, as will be explained in detail below.

Figure 3:
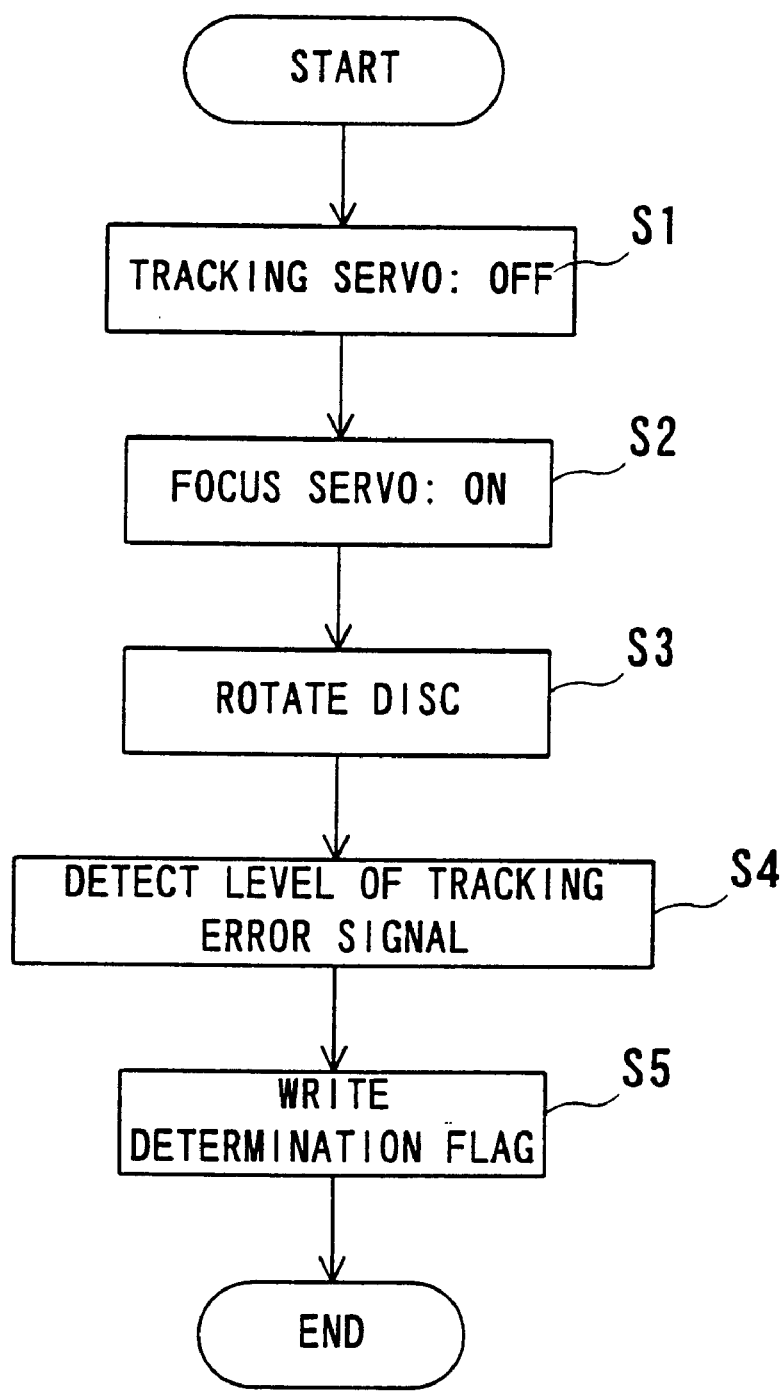
FIG. 3 is a flowchart showing operation of FIG. 1 embodiment.

In the first step S1 shown in FIG. 3, the micro-computer 20 turns off (disables) a tracking servo circuit 26. Next, in step S2 the focus servo circuit 24 is turned on (enabled). Consequently, the optical pickup 14 is controlled in directions perpendicular to a recording surface of the disc 12 by the focus servo circuit 24, according to a focus error signal.

Figure 4:
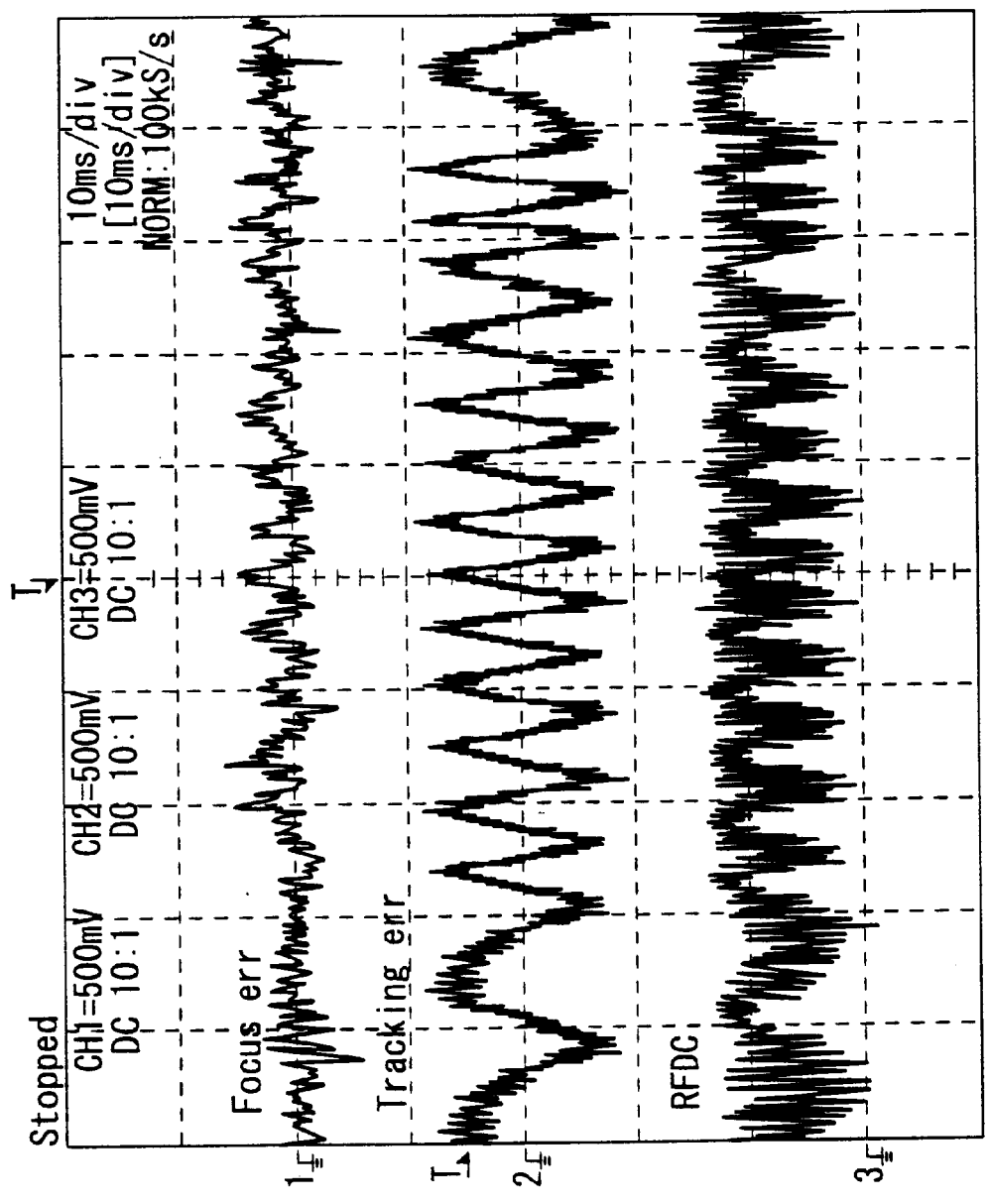
FIG. 4 is a waveform diagram showing a tracking error signal when a CD is loaded in the FIG. 1 embodiment.

In step S3 the micro-computer 20 drives a spindle motor 28 to rotate the disc 20. In step S4 the micro-computer 20 detects a tracking error signal inputted through the A/D port. At this time point, the tracking servo circuit 26 is off. On the other hand, the light receiving regions 22e and 22f are in positions with a phase difference of 180 degrees. Accordingly, the light receiving areas 22e and 22f have signals as a tracking error signal (E−F) having a waveform analogous to a sign wave, as shown in FIG. 4.

On the contrary, when a track pitch, or disc, is different from one previously fixed, the sub-beam deviates in angle and further the beam diameter becomes mismatch to a pit shape, having effects upon an output signal from the light receiving element 22 (FIG. 2). The tracking error signal (E−F), as shown in FIG. 4, is less in amplitude and further not in a similar waveform to a sine wave. The micro-computer 20, upon tracking off, detects a tracking error signal that is different depending upon a disc. Thus, it is possible for the micro-computer 20 to discriminate whether the disc being loaded is a previously fixed one (usable disc) or not.

Figure 5:
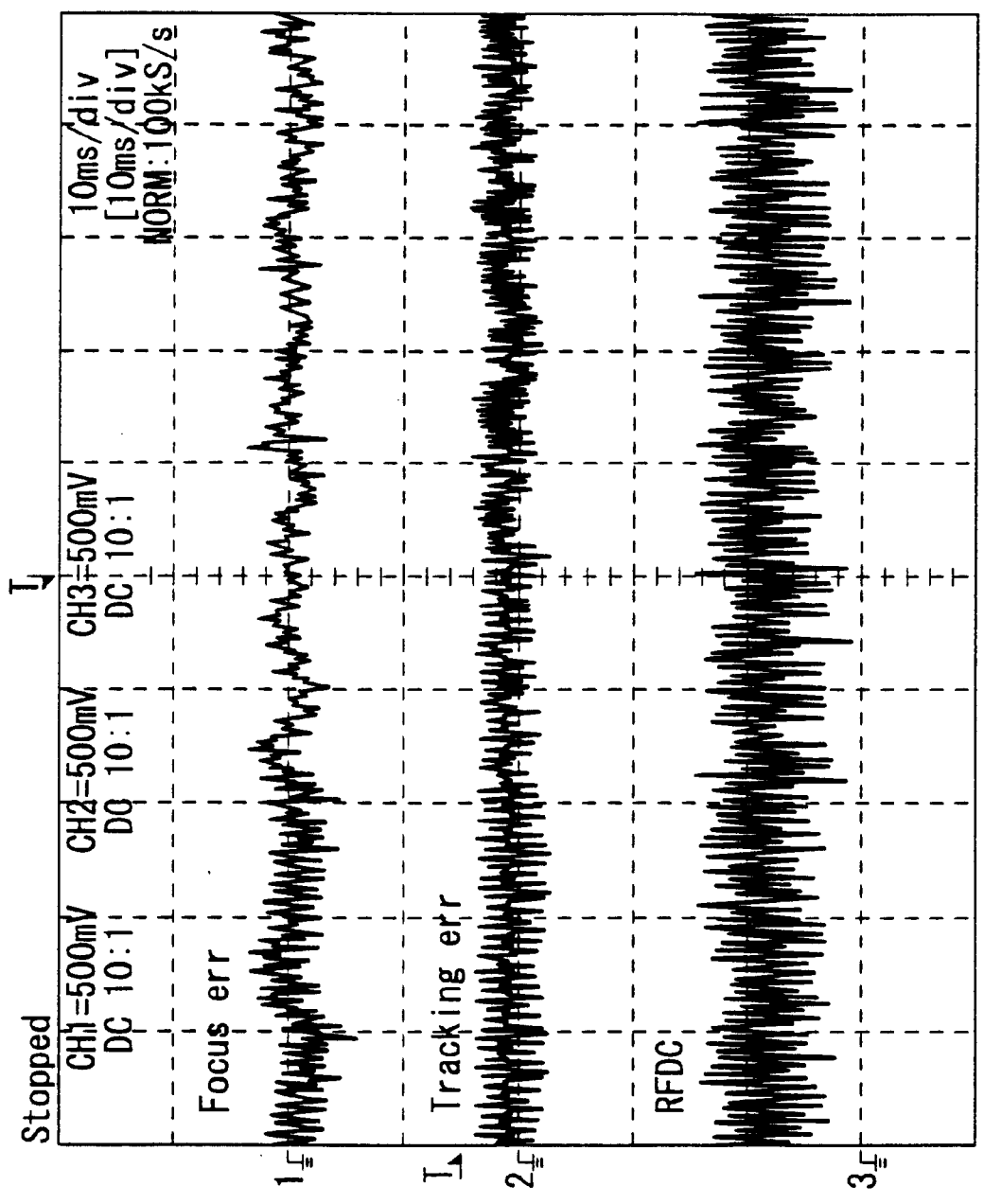
FIG. 5 is a waveform diagram showing a tracking error signal when a DVD is loaded in the FIG. 1 embodiment.

In the embodiment, the sub-beam light receiving areas 22e and 22f (FIG. 2) are arranged matched to a CD bit density (track pitch). Accordingly, a CD if loaded as a disc 12 provides a tracking error signal as in FIG. 5. Consequently, the micro-computer 20 can determine whether a CD or DVD is loaded, through detecting an amplitude of a tracking error signal during tracking off and a signal waveform.

In step S5 an discrimination flag is given "1" or "0" for a result of the discrimination of the step S4. In the embodiment, the discrimination flag is given "1" for a CD and "0" for DVD. If the discrimination flag is set "0", reproduction incapable is displayed or notified according to another program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc apparatus, comprising:

an optical pickup using one main beam and two sub-beams, said optical pickup including a main beam light receiving area to receive said main beam and two sub-beam light receiving areas to respectively receive two sub-beams;

a tracking servo circuit that receives a tracking error signal on the basis of output signals of two sub-beam light receiving areas and effects tracking control according to said tracking error signal;

a disabling circuit that disables said tracking servo circuit;

a discriminator that discriminates a disc being loaded by judging an amplitude of said tracking signal and whether or not a waveform of said tracking signal is analogous to a sine wave when said tracking servo circuit is disabled; and writing means for writing a determination flag, as a function of the result of the output of said discrimination, for enabling or disabling reproduction of the disc apparatus.

2. A disc apparatus according to claim 1, further comprising a focus servo means which receives an output signal from said main beam light receiving area to effect focus control, wherein said discriminating means discriminates said disc when said focus servo means is enabled.

* * * * *